(12) United States Patent
Barsness et al.

(10) Patent No.: US 7,254,810 B2
(45) Date of Patent: Aug. 7, 2007

(54) APPARATUS AND METHOD FOR USING DATABASE KNOWLEDGE TO OPTIMIZE A COMPUTER PROGRAM

(75) Inventors: Eric Lawrence Barsness, Pine Island, MN (US); Richard Dean Dettinger, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 10/124,936

(22) Filed: Apr. 18, 2002

(65) Prior Publication Data

US 2003/0200537 A1    Oct. 23, 2003

(51) Int. Cl.
G06F 9/45 (2006.01)
(52) U.S. Cl. .................. 717/160; 717/140; 717/151; 717/152; 717/154
(58) Field of Classification Search ............ 707/2–206; 714/38; 717/168–170, 149–158, 146–151
See application file for complete search history.

(56) References Cited

U.S. PATENT DOCUMENTS

| | | | |
|---|---|---|---|
| 5,926,819 A * | 7/1999 | Doo et al. ............... 707/104.1 |
| 6,067,641 A * | 5/2000 | McInerney et al. ........... 714/38 |
| 6,081,812 A * | 6/2000 | Boggs et al. ................ 707/202 |
| 6,356,887 B1 * | 3/2002 | Berenson et al. .............. 707/2 |
| 6,460,043 B1 * | 10/2002 | Tabbara et al. ............. 707/100 |
| 6,470,335 B1 * | 10/2002 | Marusak ........................ 707/4 |
| 6,484,188 B1 * | 11/2002 | Kwong et al. .............. 707/206 |
| 6,601,058 B2 * | 7/2003 | Forster et al. ................. 707/3 |
| 6,604,102 B2 * | 8/2003 | Klein et al. .................... 707/4 |
| 6,718,541 B2 * | 4/2004 | Ostanevich et al. ........ 717/149 |
| 6,789,071 B1 * | 9/2004 | Kapoor et al. ................. 707/2 |
| 6,847,978 B2 * | 1/2005 | Ellis et al. .................. 707/102 |
| 6,865,735 B1 * | 3/2005 | Sirer et al. .................. 717/158 |
| 2005/0065911 A1* | 3/2005 | Ellis et al. ..................... 707/2 |
| 2005/0278713 A1* | 12/2005 | Goodwin et al. ........... 717/151 |
| 2007/0006191 A1* | 1/2007 | Franz et al. ................. 717/146 |

* cited by examiner

*Primary Examiner*—Meng-Al T. An
*Assistant Examiner*—Mark P. Francis
(74) *Attorney, Agent, or Firm*—Martin & Associates, LLC (57) ABSTRACT

A code optimizer is used to optimize a computer program that references a database by determining the characteristics of the database and making suitable optimizations based on the characteristics of the database. By taking into account the characteristics of a database referenced in the computer program, the optimizer may make suitable optimizations to the computer program. Such optimizations include, without limitation, removing unnecessary calls to the database, removing unnecessary loops, removing unnecessary database operations, providing compile-time errors, and replacing dynamic calls with static data.

29 Claims, 9 Drawing Sheets

```
public void test (Connection c) throws SQLException, Exception {

Statement stmt = c.createStatement();
    ResultSet rs = null;

rs = stmt.executeQuery("select * from TESTDB.ITEM");      510
    while (rs.next() == true) {                                520
        String s = rs.getString(1);                            530
        if (rs.wasNull() != false)                             540
            doWork(s);                                         550
    }
}
```

FIG. 5

```
public void test (Connection c) throws SQLException, Exception {

Statement stmt = c.createStatement();
    ResultSet rs = null;

rs = stmt.executeQuery("select * from TESTDB.ITEM");      510
    while (rs.next() == true) {                                520
        String s = rs.getString(1);                            530
        doWork(s);                                             550
    }
}
```

FIG. 6

```
public void test (Connection c) throws SQLException, Exception {

Statement stmt = c.createStatement();
    ResultSet rs = null;

rs = stmt.executeQuery("select * from TESTDB.ITEM where I_ID   710
= 5");
        while (rs.next() == true)                                    720
            doWork(rs);                                              730
}
```

FIG. 7

```
public void test (Connection c) throws SQLException, Exception {

Statement stmt = c.createStatement();
    ResultSet rs = null;

rs = stmt.executeQuery("select * from TESTDB.ITEM where I_ID   710
= 5");
        if (rs.next() == true)                                       820
            doWork(rs);                                              730
}
```

FIG. 8

```
public void test (Connection c) throws SQLException, Exception {

Statement stmt = c.createStatement();
    ResultSet rs = null;

rs = stmt.executeQuery("select * from TESTDB.ORDER where          910
O_ID = 5");
        if (rs.next() == true) {                                      920
            rs = stmt.executeQuery("select * from                     930
TESTDB.ORDERLINE where OL_O_ID = 5");
            if (rs.next() == false)                                   940
                throw new Exception("Failed to find a match for order 950
id in orderline table."
        } else {                                                      960
            throw new Exception("Failed to find order id in order table."); 970
        }
}
```

FIG. 9

```
public void test (Connection c) throws SQLException, Exception {

Statement stmt = c.createStatement();
    ResultSet rs = null;

rs = stmt.executeQuery("select * from TESTDB.ORDER where          910
O_ID = 5");
        if (rs.next() == true) {                                      920
            ; //no-op                                                 1030
        } else {                                                      960
            throw new Exception("Failed to find order id in order table."); 970
        }
}
```

FIG. 10

```
public void test (Connection c) throws SQLException, Exception {

Statement stmt = c.createStatement();
    ResultSet rs = null;

// The following line gives a compile time error if either database    1102
// TESTDB or table ITEM in TESTDB do not exist.                        1104
    rs = stmt.executeQuery("select * from TESTDB.ITEM");               1110
    while (rs.next() == true) {                                        1120
// The following line gives a compile time error if a column named     1106
// "Col1" does not exist in table ITEM in TESTDB.                      1108
        String s = rs.getString("Col1");                               1130
        doWork(s);                                                     1140
    }
}
```

FIG. 11

```
public void test (Connection c) throws SQLException, Exception {

Statement stmt = c.createStatement();
    ResultSet rs = null;
    ResultSetMetaData rsmd = null;

rs = stmt.executeQuery("select * from TESTDB.ITEM");    1210
    rsmd = rs.getMetaData();                                 1220
    int colCount = rsmd.getColumnCount();                    1230
    while (rs.next() == true) {                              1240
        for (int i=0, i<colCount; i++)                       1250
            doWork(rs.getObject(i));                         1260
    }
}
```

FIG. 12

```
public void test (Connection c) throws SQLException, Exception {

Statement stmt = c.createStatement();
    ResultSet rs = null;

rs = stmt.executeQuery("select * from TESTDB.ITEM");    1210
    while (rs.next() == true) {                              1240
        for (int i=0, i<5; i++)                              1350
            doWork(rs.getObject(i));                         1260
    }
}
```

FIG. 13

```
public void test (Connection c) throws SQLException, Exception {

Statement stmt = c.createStatement();
    ResultSet rs = null;

rs = stmt.executeQuery("select * from TESTDB.ITEM");   1410
    while (rs.next() == true) {                             1420
        String s = rs.getString("Col1");                    1430
        doWork(s);                                          1440
    }
}
```

FIG. 14

```
public void test (Connection c) throws SQLException, Exception {

Statement stmt = c.createStatement();
    ResultSet rs = null;

rs = stmt.executeQuery("select * from TESTDB.ITEM");   1410
    while (rs.next() == true) {                             1420
        String s = rs.getString(1);                         1530
        doWork(s);                                          1440
    }
}
```

FIG. 15

APPARATUS AND METHOD FOR USING DATABASE KNOWLEDGE TO OPTIMIZE A COMPUTER PROGRAM

BACKGROUND OF THE INVENTION

1. Technical Field

This invention generally relates to computer systems, and more specifically relates to ways to optimize computer programs.

2. Background Art

Since the dawn of the computer age, computer systems have evolved into extremely sophisticated devices, and computer systems may be found in many different settings. Dramatic advances in both hardware and software (e.g., computer programs) have drastically improved the performance of computer systems. Modem software has become very complex when compared to early computer programs. Many modem computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modem computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

Many known compilers include optimizers that perform optimizations that decrease the execution time of a computer program. One type of known optimizer is a profiling optimizer that monitors the code as it runs, collects performance data known as profile data, then uses the profile data to make optimizations to the code. While these types of optimizers effectively improve the performance of the code, they do not address many aspects of the code that could benefit from further improvements. For example, when a computer program accesses a database, known optimizers do not take into account any information relating to the database in making their optimizations. Without improved apparatus and methods for optimizing a computer program that take into account characteristics of a database referenced in the computer program, the computer industry will continue to suffer from computer code that has not been fully optimized.

DISCLOSURE OF INVENTION

According to the preferred embodiments, a code optimizer is used to optimize a computer program that references a database by determining the characteristics of the database and making suitable optimizations based on the characteristics of the database. By taking into account the characteristics of a database referenced in the computer program, the optimizer may make suitable optimizations to the computer program. Such optimizations include, without limitation, removing unnecessary calls to the database, removing unnecessary loops, removing unnecessary database operations, providing compile-time errors, and replacing dynamic calls with static data.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 2:
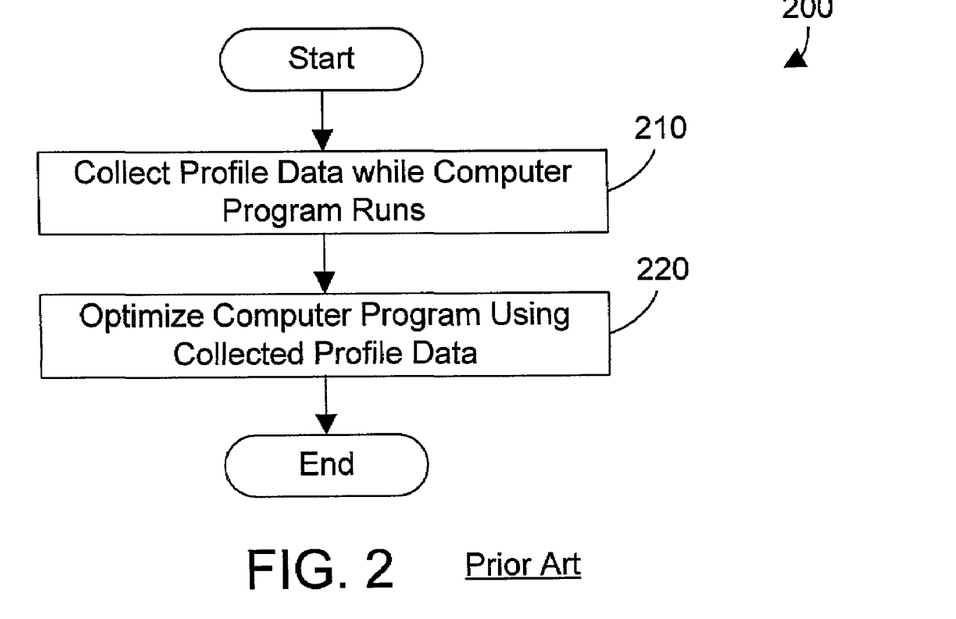
FIG. 2 is a flow diagram of a prior art method for performing optimizations on a computer program.

As stated in the Background section, optimizers are known that use profile data to optimize a computer program. One example of a prior art optimization method that uses profile data is shown in FIG. 2. Method 200 begins by collecting profile data while a computer program runs (step 210). Collecting profile data includes the steps of generating executable code for the computer program, then executing the code under conditions that simulate the assumed run-time environment. Profile data may be collected as the computer program runs using a number of different techniques, including instrumenting the computer program with code that increments counters, collecting a run-time trace that indicates which instructions were executed, etc. Once the profile data is collected, an optimizing compiler (or optimizer) may use the collected profile data to make optimizations to the computer program (step 220).

Prior art method 200 as shown in FIG. 2 is an effective way to optimize a computer program for certain inefficiencies, but does not account for some. For example, known optimizing compilers (or optimizers) do not use any database information in making optimizations. The preferred embodiments improve the optimization of a computer program that accesses a database, which is the subject matter of the present invention.

Figure 3:
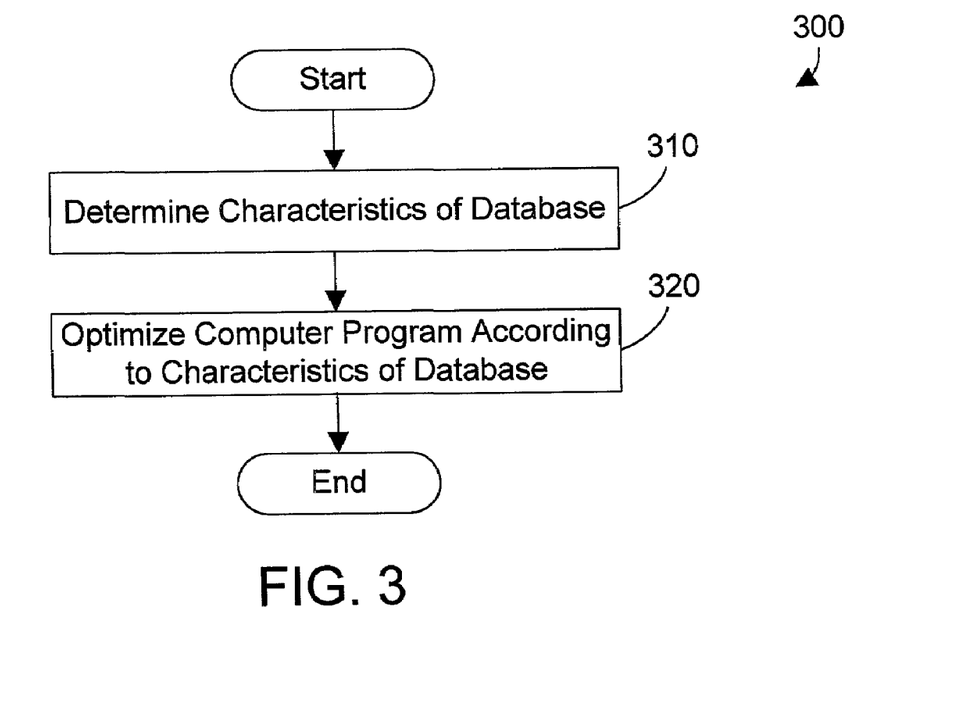
FIG. 3 is a flow diagram of a method for optimizing a computer program in accordance with the preferred embodiments.

Referring to FIG. 3, a method 300 for optimizing a computer program in accordance with the preferred embodiments begins by determining characteristics of the database (step 310). Next, the computer program is optimized according to the characteristics of the database (step 320). Method 300 is an advance over the state of the art because it allows more optimizations to be made based on characteristics of a database accessed in the computer program.

In the preferred embodiments, the characteristics of the database are determined by querying the database. One suitable way to obtain characteristics of the database is to read a schema file for the database. A schema file for a database typically includes information regarding the tables and their defined fields stored in the database, the type of data for each field, the length of each field, etc. Another term known in the art that is generally synonymous with database schema is metadata for a database. Whatever the form, the preferred embodiments expressly extend to any way of determining characteristics of a database referenced in a computer program.

Figure 1:
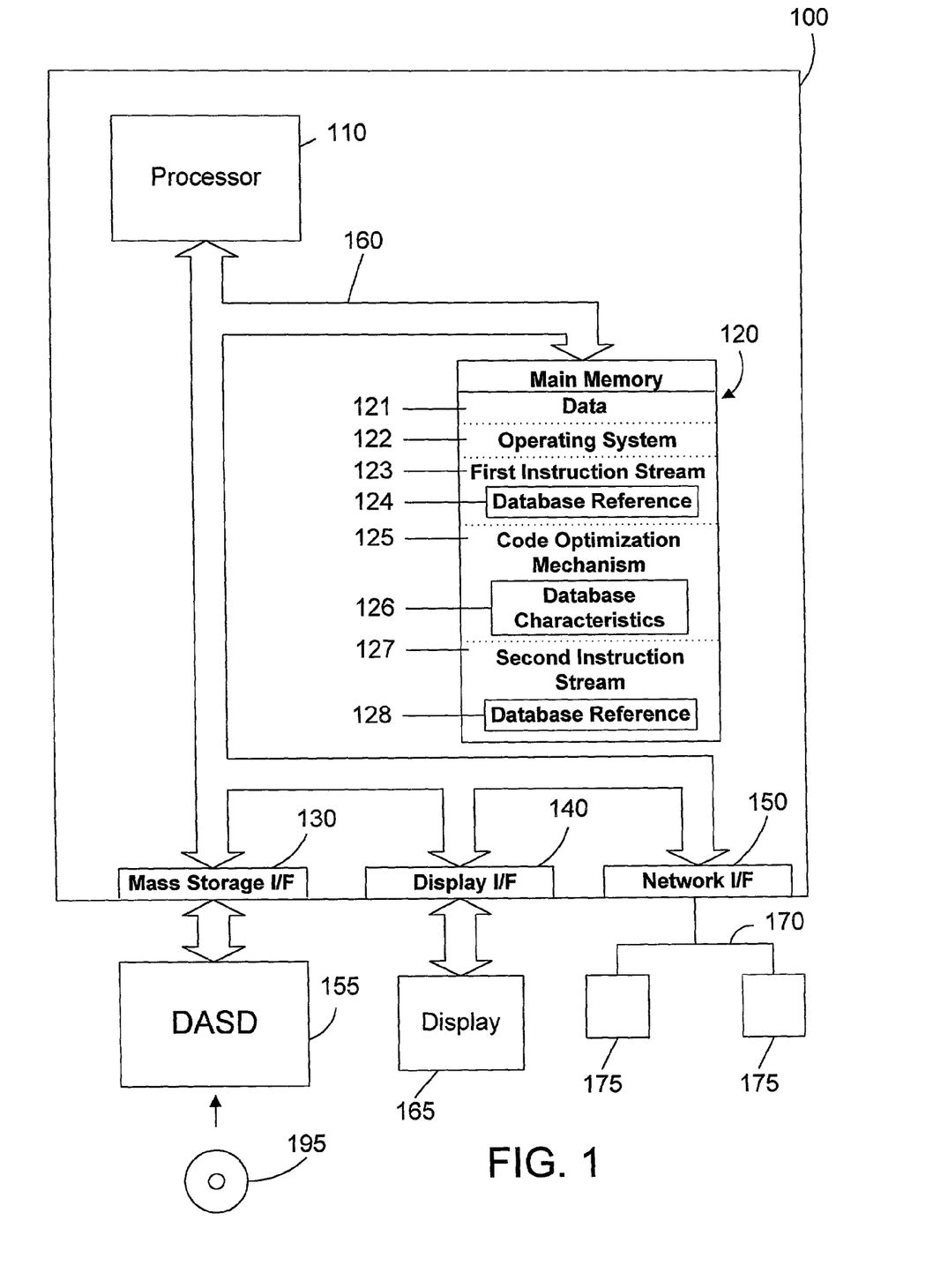
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 121, an operating system 122, a first instruction stream 123, a code optimization mechanism 125, and a second instruction stream 127. First instruction stream 123 includes one or more database references 124. The term "database reference" is used in a broad sense to mean any access to a database. The code optimization mechanism 125 includes database characteristics 126 that describe the database referenced by the database reference 124. Note that the database itself is not shown in FIG. 1, but could also reside within main memory 120 or on direct access storage device 155. In many cases the database will reside on a remote computer system accessible via network interface 150. Note also that the second instruction stream 127 is shown in FIG. 1 to include a database reference 128. While it may be possible in certain circumstances to optimize the first instruction stream 123 to remove the database reference 124, in most cases the database reference 124 will appear in second instruction stream 127 as well, either in its original form or in a new form, both of which are included in database reference 128.

Note that the first instruction stream 123, code optimization mechanism 125, and second instruction stream 127 are all shown residing in memory 120 for the convenience of showing all of these elements in one drawing. One skilled in the art will appreciate that this is not the normal mode of operation for most code optimizers, such as optimizing compilers. The preferred embodiments expressly extend to any suitable configuration and number of computer systems to generate the first instruction stream 123. The "apparatus" described herein and in the claims expressly extends to a multiple computer configuration.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, first instruction stream 123, code optimization mechanism 125, and second instruction stream 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. First instruction stream 123 is a computer program or portion thereof. This first instruction stream 123 may be written in a low-level language such as assembly code, or could alternatively be written in a high-level language. In addition, first instruction stream 123 could be an intermediate representation of a high level language generated by a compiler. Second instruction stream 127 is the first instruction stream 123 after processing to optimize it according to the characteristics of the database being referenced by the database reference 124. Second instruction stream 127 may be in any suitable form, including high level source code, intermediate code, assembly code, or executable machine code.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 195 of FIG. 1), and transmission type media such as digital and analog communications links.

In FIG. 1, code optimization mechanism 125 is the mechanism that performs the optimizations in step 320 of FIG. 3. In addition, code optimization mechanism 125 may additionally perform step 310 as well. In the alternative, the characteristics of the database could be determined in step 310 by a different mechanism, which then passes this information to the code optimization mechanism 125. Note that code optimization mechanism 125 may reside within an optimizing compiler.

Figure 4:
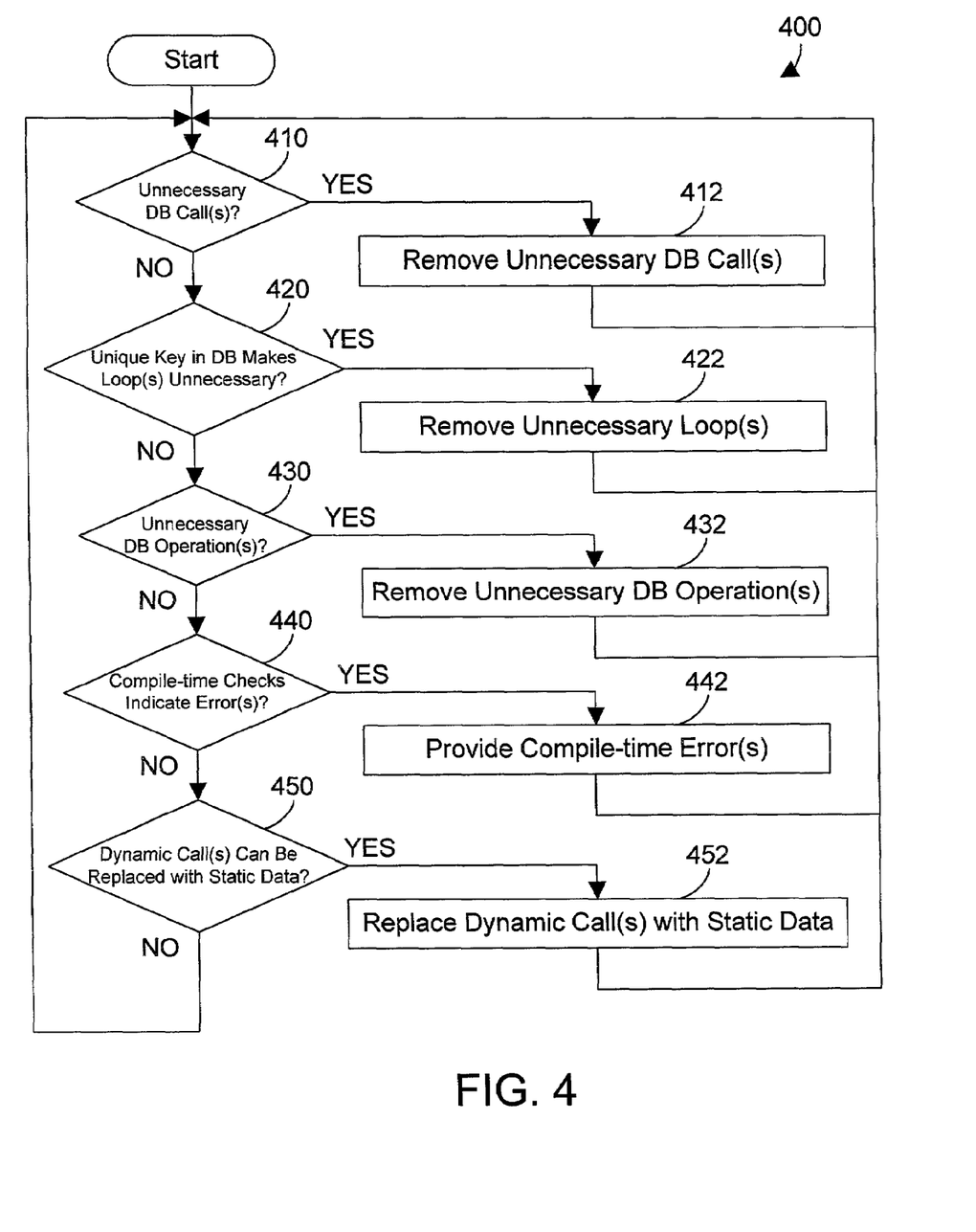
FIG. 4 is a flow diagram of a method for optimizing a computer program in accordance with the preferred embodiments.

Referring now to FIG. 4, a method 400 provides details regarding specific code optimizations within the scope of the preferred embodiments that code optimization mechanism 125 may make. Note that each of these depend on characteristics of the database being accessed by the first instruction stream. If the characteristics of the database make one or more calls to the database unnecessary (step 410=YES), any of the unnecessary calls may be removed from the first instruction stream (step 412). If the database includes a unique key that is used in the first instruction stream that makes one or more loops unnecessary (step 420=YES), any unnecessary loop may be removed from the first instruction stream (step 422). If the characteristics of the database make certain database operations in the first instruction stream unnecessary (step 430=YES), any unnecessary database operation may be removed (step 432). If compile-time checks indicate errors based on the characteristics of the database (step 440=YES), the errors are provided to the operator (step 442). Based on the characteristics of the database, if one or more dynamic calls in the first instruction stream may be replaced with static data (step 450=YES), any of these identified dynamic calls may be replaced with static data (step 452). Note that each optimization shown in steps 412, 422, 432, 442, and 452 in FIG. 4 may be performed independently of each other in the preferred embodiments. They are all shown in FIG. 4 as a simple way of depicting the various different optimizations that may be performed. Of course, other optimizations may also be performed based on characteristics of the database, and the preferred embodiments expressly extend to any and all optimizations that are based on characteristics of a database referenced in the instruction stream.

Figure 5:
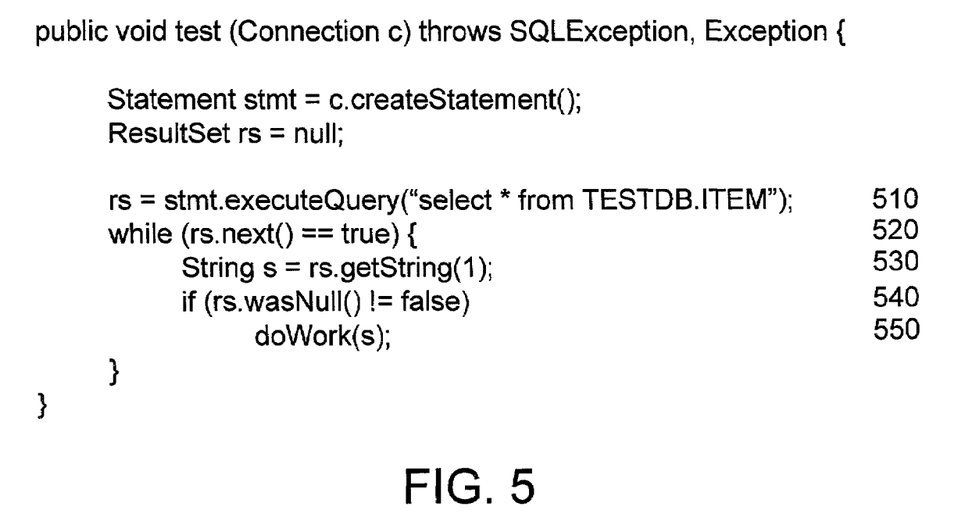
FIG. 5 is a diagram showing sample code before making optimizations in accordance with the preferred embodiments.
Figure 6:
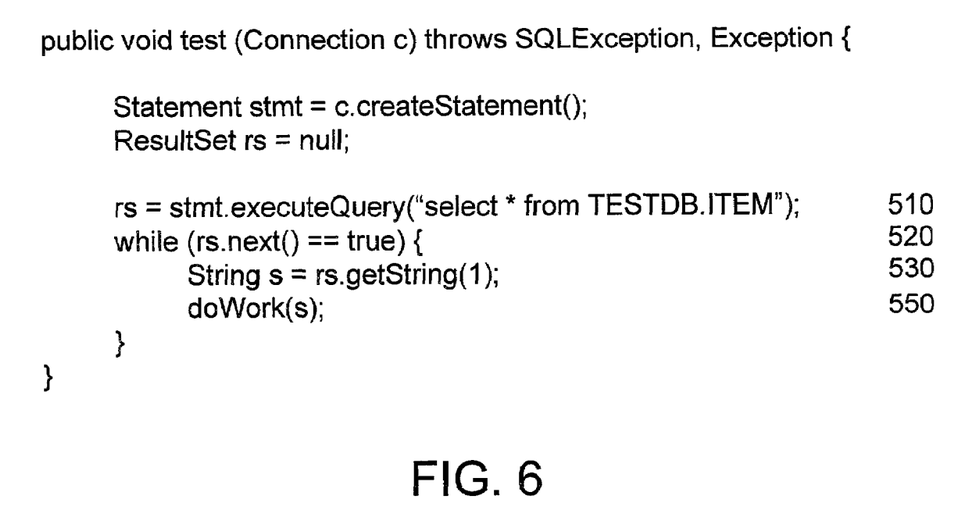
FIG. 6 is a diagram showing the sample code of FIG. 5 after making optimizations in accordance with the preferred embodiments.

Examples of each of the detailed optimizations shown in FIG. 4 are shown for the sake of illustration in FIGS. 5-15. FIGS. 5 and 6 show an example of removing unnecessary database calls within the scope of step 412 of FIG. 4. Referring first to FIG. 5, sample code is provided that accesses a database in line 510 by executing a query to an ITEM table in a TESTDB database. Line 520 shows the start of a "while" loop. Line 530 is an instruction that assigns a string variable "s" the value of a string retrieved from the first entry in the result set "rs". Line 540 checks to see of the result set entry was null. If not, line 550 calls a method doWork( ) that is symbolic of a method call or other code that performs some specified operations on the string "s".

We assume that the characteristics of the database specify that the columns in the ITEM table in the TESTDB database cannot have a "null" value. As a result, the code optimization mechanism determines that the "if" statement at line 540 is not needed, because rs.wasNull( ) will always be false. Line 540 is thus deleted in step 412 of FIG. 4, resulting in the second instruction stream shown in FIG. 6.

Figure 7:
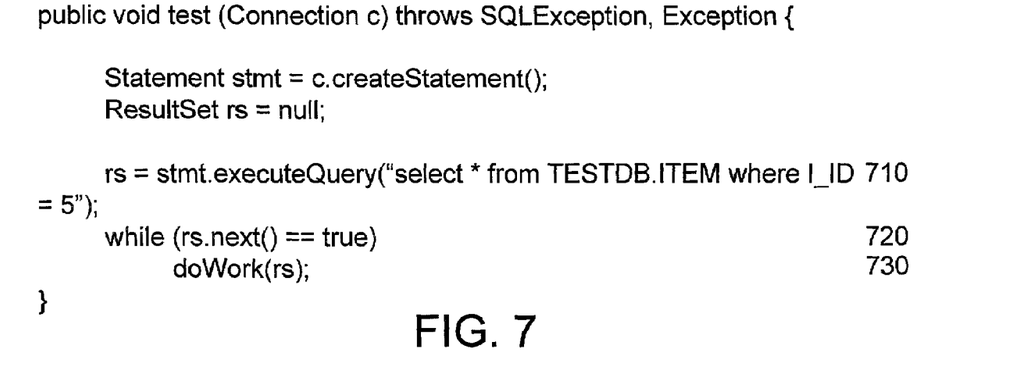
FIG. 7 is a diagram showing sample code before making optimizations in accordance with the preferred embodiments.
Figure 8:
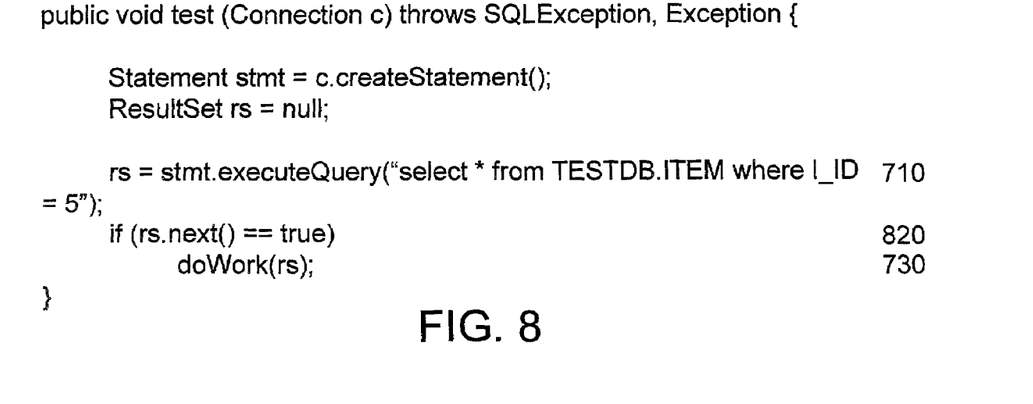
FIG. 8 is a diagram showing the sample code of FIG. 7 after making optimizations in accordance with the preferred embodiments.

FIGS. 7 and 8 show an example of how the code optimization mechanism of the preferred embodiments can remove an unnecessary loop, as shown in step 422 of FIG. 4. The sample code in FIG. 7 includes an instruction at line 710 that executes a query that accesses the ITEM table in the TESTDB database. The query includes the condition "where I_ID=5", which specifies to return results when the item ID (I_ID) is equal to five. The instruction at line 720 is the beginning of a "while" loop, and the instruction at line 730 is representative of work that could be performed on the result set "rs".

We assume that the characteristics of the database specify that the ITEM column is a column that holds a unique key for the table. This means that only one entry in the table can satisfy the "where" clause of the query in line 710. As a result of knowing the characteristics of the database, the code optimization mechanism can eliminate a loop. Referring to FIG. 8, the while statement at line 720 of FIG. 7 has been replaced with an "if" statement at line 820. This allows eliminating the "while" loop by replacing it with the "if" statement, due to the knowledge of the characteristics of the database.

Figure 9:
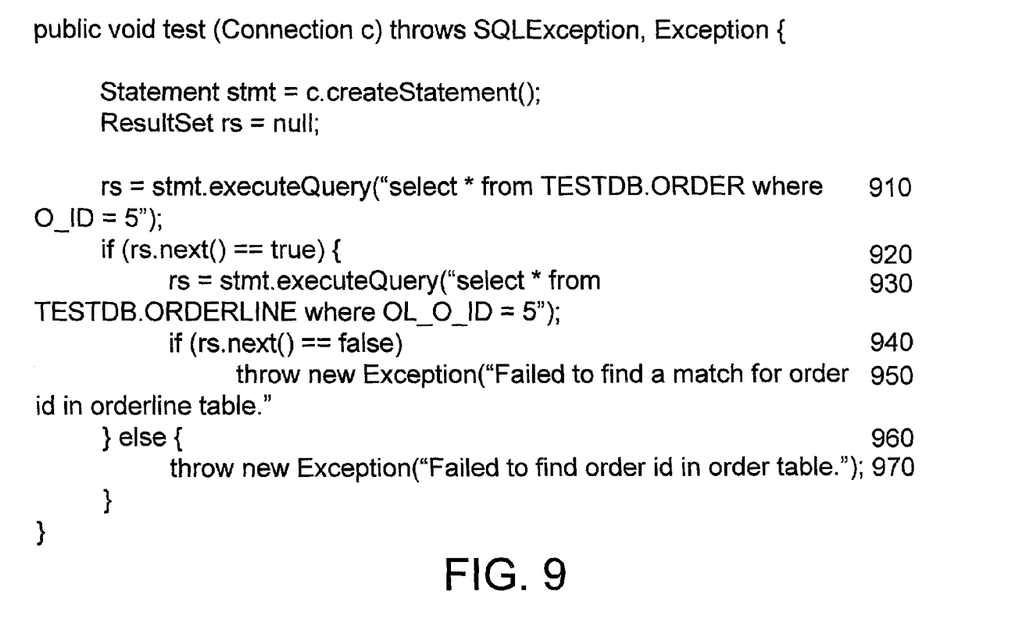
FIG. 9 is a diagram showing sample code before making optimizations in accordance with the preferred embodiments.
Figure 10:
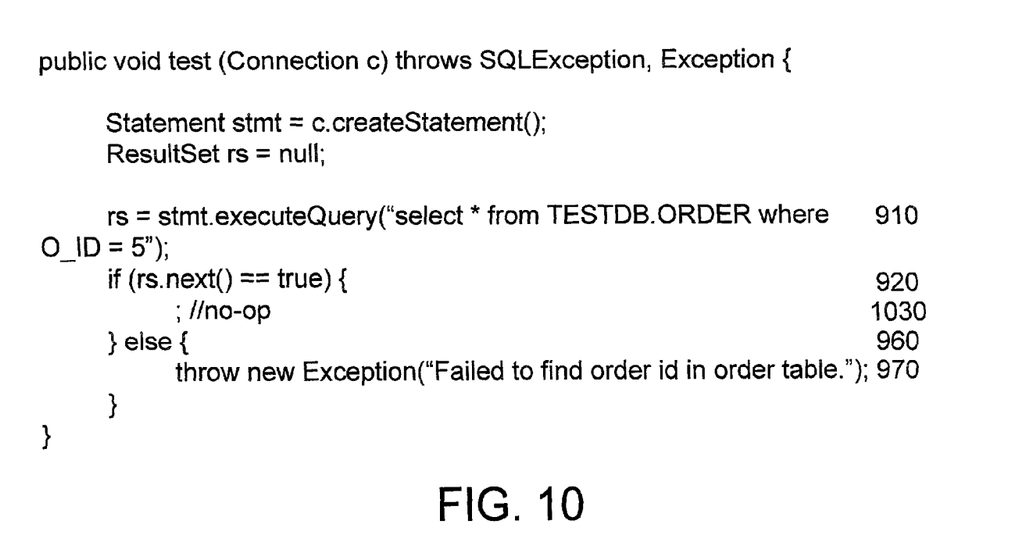
FIG. 10 is a diagram showing the sample code of FIG. 9 after making optimizations in accordance with the preferred embodiments.

An example is now presented in FIGS. 9 and 10 to show how the code optimization mechanism of the preferred embodiments can remove unnecessary database operations, as shown in step 432 of FIG. 4. The sample code in FIG. 9 includes an instruction at line 910 that accesses the ORDER table in the TESTDB database via a query. Line 920 is the start of an "if" statement. Line 930 accesses the ORDER- LINE table in the TESTDB database. If no result is returned from the query in line 930, the "if" statement in line 940 is satisfied, so line 950 is executed that throws an exception because the order id (OL_O_ID) was not found in the ORDERLINE table. If the condition in line 920 is not satisfied, the else statement at line 960 is executed instead of the instructions at lines 930 and 940, which causes the statement at line 970 to be executed, throwing an exception if the order id (O_ID) was not found in the ORDER table.

We now assume that the characteristics of the TESTDB database indicate that referential integrity set on the tables ensure that once a record exists in the ORDER table, a corresponding record exists in the ORDERLINE table. With this knowledge of the characteristics of the database, the code optimizer may now remove the database reference at line 930 and the code that follows at lines 940 and 950. In the second instruction stream as shown in FIG. 10, the no-op at line 1030 has replaced lines 930, 940 and 950 in FIG. 9.

Figure 11:
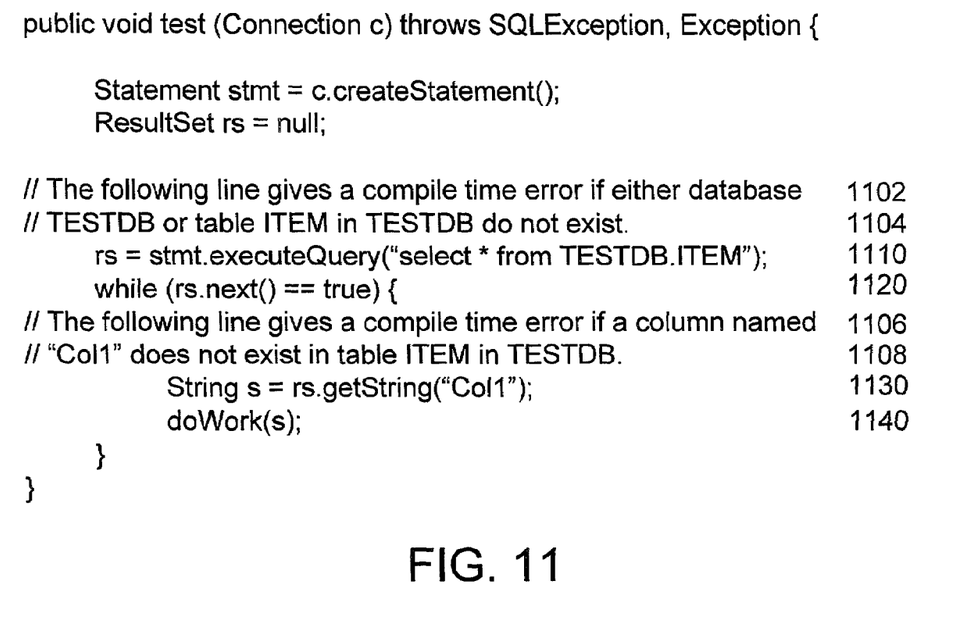
FIG. 11 is a diagram showing sample code that indicates when errors are generated at compile-time to indicate potential problems in accordance with the preferred embodiments.

Another advantage of the preferred embodiments is the ability to generate compile-time errors based on characteristics of the database. Thus, if the code attempts to access a column that does not exist, an error message may be generated indicating the error. We assume the code optimization mechanism of the preferred embodiments includes compile-time error checking according to the characteristics of the database, as shown in step 442 of FIG. 4. Referring now to FIG. 11, line 1110 includes an instruction that executes a query to an ITEM table in the TESTDB database. If either the TESTDB database does not exist, or if the ITEM table does not exist within the TESTDB database, a compile-time error is given as specified in the comments at lines 1102 and 1104. At line 1130, a string "s" is defined that is taken from a column called "Col1" in the ITEM table in the TESTDB database. Some work may then be performed on the string "s" at line 1140. If the column named "Col1" does not exist in the ITEM table, the code optimization mechanism provides a compile-time error, as specified in the comments at lines 1106 and 1108. The preferred embodiments thus allow a compiler to detect errors in the code based on characteristics of the database, and prompt an operator to correct these errors before compilation of the code continues.

Figure 12:
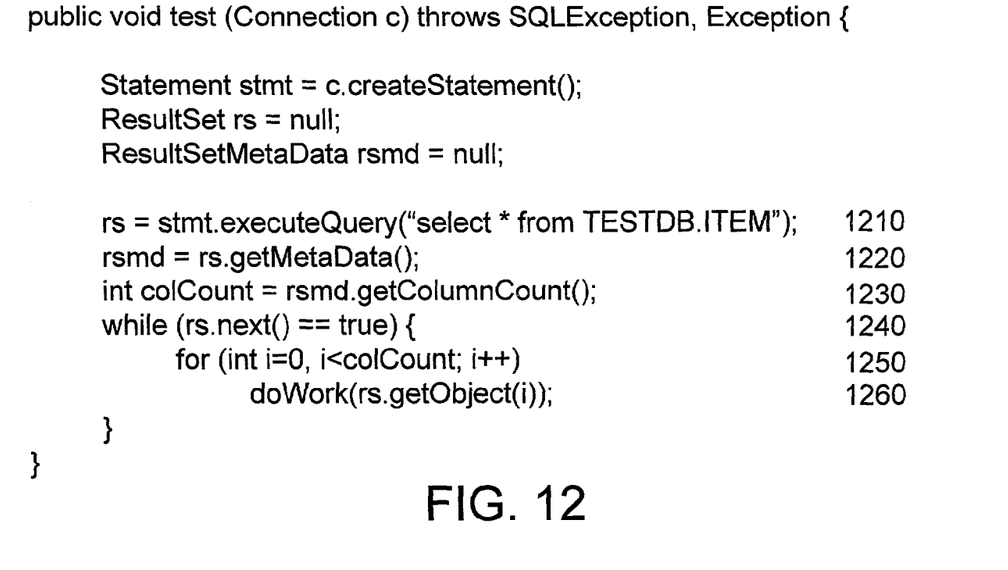
FIG. 12 is a diagram showing sample code before making optimizations in accordance with the preferred embodiments.
Figure 13:
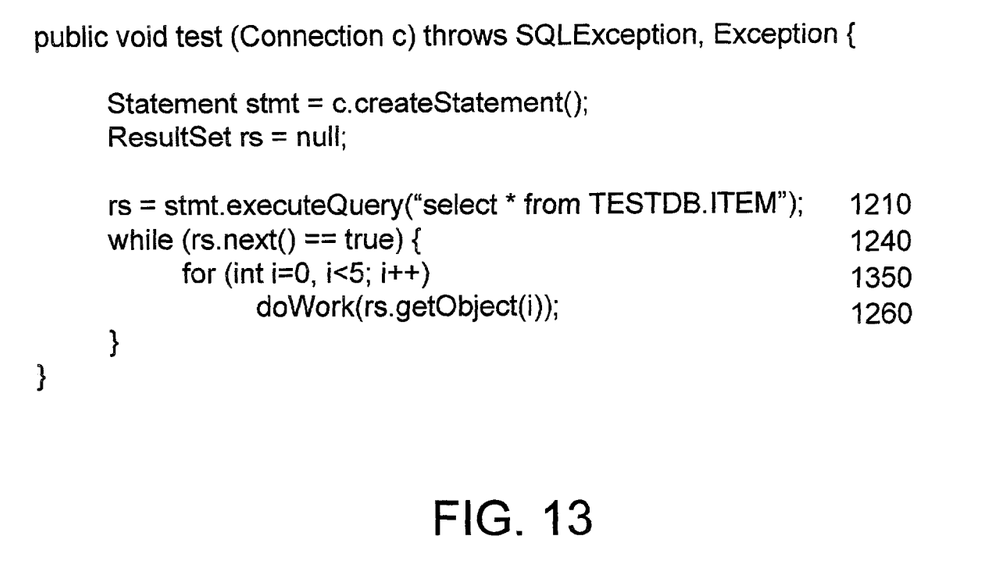
FIG. 13 is a diagram showing the sample code of FIG. 12 after making optimizations in accordance with the preferred embodiments.

An example is now presented in FIGS. 12 and 13 that show how the code optimization mechanism of the preferred embodiments can replace dynamic calls in the first instruction stream with static data, as shown in step 452 of FIG. 4. In FIG. 12, line 1210 includes a database query to the ITEM table in the TESTDB database. Line 1220 retrieves metadata about the data returned by the query, and line 1230 assigns a variable colCount a value of the number of columns returned by the query. In this example, the query returns all of the columns in the ITEM table. Line 1240 is the start of a "while" loop. Line 1250 contains a "for" statement, with line 1260 specifying some work to perform while the conditions in the "for" statement at line 1250 are satisfied. Note that the "for" statement at line 1250 includes the variable colCount that has a value of the number of columns in the ITEM table.

Once the code optimization mechanism determines the characteristics of the database, some of the code in FIG. 12 becomes unnecessary. For example, let's assume that the characteristics of the database specify that the ITEM table has five columns. In this case, the instruction at lines 1220 and 1230 can be deleted, and the colCount variable at line 1250 can be replace with the value "5", as shown in line 1350 of FIG. 13. The example in FIGS. 12 and 13 show that knowledge of the characteristics of the database allow the code optimization mechanism of the preferred embodiments to perform additional optimizations not known in the art.

Figure 14:
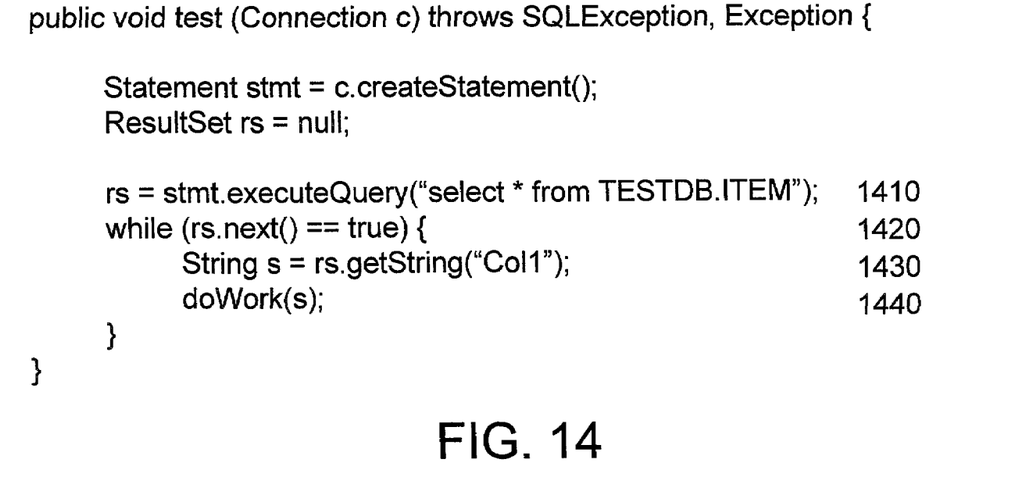
FIG. 14 is a diagram showing sample code before making optimizations in accordance with the preferred embodiments.
Figure 15:
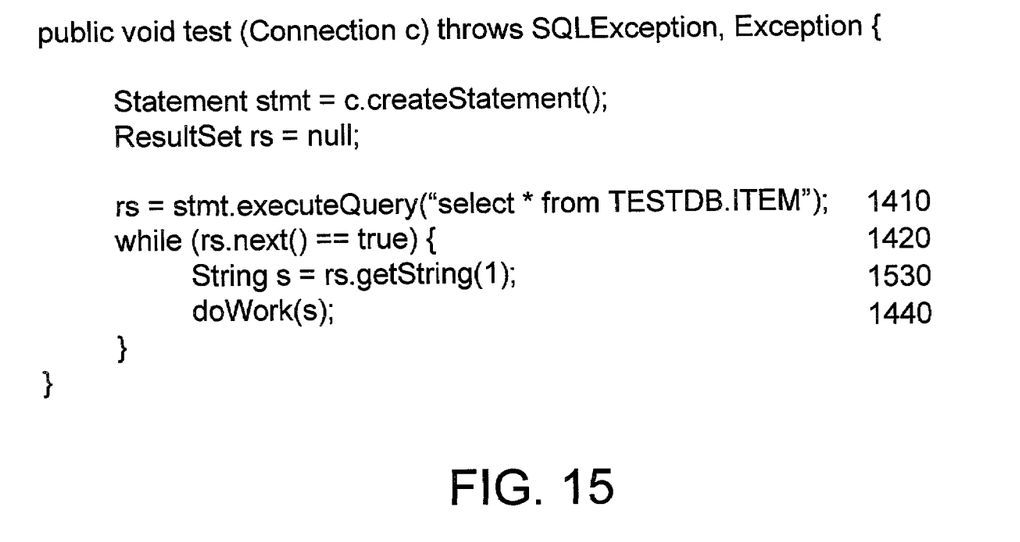
FIG. 15 is a diagram showing the sample code of FIG. 14 after making optimizations in accordance with the preferred embodiments.

An example is presented in FIGS. 14 and 15 that show how a column name can be replaced with an offset, which is another optimization that is within the scope of the preferred embodiments. Line 1410 shows an instruction that executes a query to the ITEM table in the TESTDB database. Line 1420 is the beginning of a "while" loop. Line 1430 assigns a value to a string "s" based on a column name "Col1". Work is then performed on the string in line 1440.

We assume that the characteristics of the database indicate that the column named "Col1" in the ITEM table is the first column. As a result, the reference to the column name can be replaced with a reference to a numerical offset in the table. Thus, line 1430 in FIG. 14 is replaced with line 1530 in FIG. 15, where the string "Col1" has been replaced by an integer value "1" indicating that the column that has the name "Col1" is the first column in the table.

The preferred embodiments provide a significant advantage over the prior art by performing optimizations according to characteristics of a database referenced in the first instruction stream. The resulting code is a second instruction stream that is more optimized than the first instruction stream. Nowhere does the prior art teach or suggest using database knowledge to optimize an instruction stream as disclosed herein.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, specific optimizations are shown herein in FIG. 4, with examples in FIGS. 5-15. However, the preferred embodiments expressly extend to making any and all optimizations based on characteristics of a database.

What is claimed is:

1. An apparatus comprising:
   at least one processor;
   a memory coupled to the at least one processor;
   a first instruction stream residing in the memory; and
   a code optimization mechanism residing in the memory and executed by the at least one processor, the code optimization mechanism reading an instruction in the first instruction stream that references a database having metadata, accessing the metadata of the database, and optimizing the first instruction stream to generate therefrom a second instruction stream according to the metadata of the database referenced in the first instruction stream, wherein the code optimization mechanism removes at least one loop from the first instruction stream that is unnecessary as determined by the metadata.

2. The apparatus of claim 1 wherein the code optimization mechanism resides within an optimizing compiler and the first instruction stream is the input to the optimizing compiler and the second instruction stream is the output of the optimizing compiler.

3. The apparatus of claim 1 wherein the metadata comprises a schema of the database.

4. The apparatus of claim 1 wherein the code optimization mechanism resides within an optimizing compiler.

5. The apparatus of claim 1 wherein the code optimization mechanism deletes at least one unnecessary call to the database in the first instruction stream.

6. The apparatus of claim 1 wherein the code optimization mechanism removes at least one unnecessary database operation from the first instruction stream.

7. The apparatus of claim 1 wherein the code optimization mechanism provides at least one error message at compile-time to indicate potential problems with the first instruction stream based on the metadata.

8. The apparatus of claim 1 wherein the code optimization mechanism replaces at least one dynamic call in the first instruction stream with static data.

9. An apparatus comprising:
at least one processor;
a memory coupled to the at least one processor;
a first instruction stream residing in the memory;
a code optimization mechanism residing in the memory and executed by the at least one processor, the code optimization mechanism querying a database referenced in the first instruction stream to determine database metadata, the code optimization mechanism optimizing the first instruction stream to generate therefrom a second instruction stream according to the database metadata, the code optimization mechanism deleting at least one unnecessary call to the database in the first instruction stream, the code optimization mechanism removing at least one loop from the first instruction stream that is unnecessary as determined by the metadata, the code optimization mechanism removing at least one unnecessary database operation from the first instruction stream, the code optimization mechanism replacing at least one dynamic call in the first instruction stream with static data.

10. The apparatus of claim 9 wherein the code optimization mechanism provides at least one error message at compile-time to indicate potential problems with the first instruction stream based on the database metadata.

11. The apparatus of claim 9 wherein the database metadata comprises a schema of the database.

12. A method for optimizing a first instruction stream comprising the steps of:
(A) determining metadata of a database referenced in an instruction in the first instruction stream by querying the database; and
(B) optimizing the first instruction stream to generate therefrom a second instruction stream according to the metadata where optimizing comprises removing at least one loop from the first instruction stream that is unnecessary as determined by the metadata.

13. The method of claim 12 wherein the metadata comprises a schema of the database.

14. The method of claim 12 wherein optimizing is done within an optimizing compiler and the first instruction stream is the input to the optimizing compiler and the second instruction stream is the output of the optimizing compiler.

15. The method of claim 12 wherein step (B) comprises the step of deleting unnecessary calls to the database in the first instruction stream.

16. The method of claim 12 wherein step (B) comprises the step of removing unnecessary database operations from the first instruction stream.

17. The method of claim 12 wherein step (B) comprises the step of providing at least one error message at compile-time to indicate potential problems with the first instruction stream based on the metadata.

18. The method of claim 12 wherein step (B) comprises the step of replacing at least one dynamic call in the first instruction stream with static data.

19. A method for optimizing a first instruction stream comprising the steps of:
(A) querying a database referenced in the first instruction stream to determine metadata of the database;
(B) deleting at least one unnecessary call to the database in the first instruction stream;
(C) removing at least one loop from the first instruction stream that is unnecessary as determined by the metadata of the database;
(D) removing at least one unnecessary database operation from the first instruction stream; and
(E) replacing at least one dynamic call in the first instruction stream with static data.

20. The method of claim 19 further comprising the step of providing at least one error message at compile-time to indicate potential problems with the first instruction stream based on the database information.

21. The method of claim 19 wherein the metadata of the database comprises a schema of the database.

22. A computer-readable program product stored in storage media, comprising:
a code optimization mechanism that optimizes a first instruction stream to generate therefrom a second instruction stream according to metadata of a database referenced in the first instruction stream by reading an instruction in the first instruction stream that references the database, accessing the metadata of the database, and optimizing the first instruction stream to generate therefrom a second instruction stream according to the metadata of the database referenced in the first instruction stream, wherein the code optimization mechanism removes at least one loop from the first instruction stream that is unnecessary as determined by the metadata.

23. The program product of claim 22 wherein the metadata of the database comprises a schema.

24. The program product of claim 22 wherein the code optimization mechanism resides within an optimizing compiler and the first instruction stream is the input to the optimizing compiler and the second instruction stream is the output of the optimizing compiler.

25. The program product of claim 22 wherein the code optimization mechanism resides within an optimizing compiler.

26. The program product of claim 22 wherein the code optimization mechanism deletes at least one unnecessary call to the database in the first instruction stream.

27. The program product of claim 22 wherein the code optimization mechanism removes at least one unnecessary database operation from the first instruction stream.

28. The program product of claim 22 wherein the code optimization mechanism provides at least one error message at compile-time to indicate potential problems with the first instruction stream based on the metadata.

29. The program product of claim 22 wherein the code optimization mechanism replaces at least one dynamic call in the first instruction stream with static data.

* * * * *